United States Patent [19]

Kitaura

[11] 4,192,590
[45] Mar. 11, 1980

[54] INDICATING SYSTEM FOR CAMERAS

[75] Inventor: Mashio Kitaura, Tondabayashi, Japan

[73] Assignee: Minolta Camera Kabushiki Kaisha, Osaka, Japan

[21] Appl. No.: 941,730

[22] Filed: Sep. 12, 1978

[30] Foreign Application Priority Data

Sep. 13, 1977 [JP] Japan .......................... 52-124035[U]

[51] Int. Cl.² .......................... G03B 17/20; G03B 7/16
[52] U.S. Cl. .......................................... 354/53; 354/33; 354/60 F; 354/60 L
[58] Field of Search .............. 354/23 D, 33, 53, 60 R, 354/60 F, 60 L

[56] References Cited

U.S. PATENT DOCUMENTS

| | | | |
|---|---|---|---|
| 3,990,799 | 11/1976 | Nanba et al. | 354/60 L |
| 4,091,396 | 5/1978 | Sahara et al. | 354/60 L |
| 4,095,243 | 6/1978 | Numata et al. | 354/60 L |

*Primary Examiner*—Russell E. Adams

*Attorney, Agent, or Firm*—Watson, Cole, Grindle & Watson

[57] ABSTRACT

An indicating system for use in a photographic camera of the type having a focal plane shutter and permitting flash firing only when the shutter speed is longer than a given value to ensure the full uncovering of the film surface upon flash firing. The indicating system normally indicates an exposure time to be effected in accordance with the object brightness. When the indicated prospective exposure time is longer than the given value, an indication member of the system provides a different indication than the normal exposure time indication. The indicating system includes a plurality of light emitting diodes (LEDs) of the same number corresponding to that of the exposure times to be indicated, with the LEDs being selectively energized continuously to indicate a respective exposure time. When the object brightness is so low that one of the LEDs corresponding to an exposure time longer than the given value is energized, the LED to be lit is intermittently energized to flash upon charge completion of the main capacitor of an electronic flash device.

9 Claims, 4 Drawing Figures

INDICATING SYSTEM FOR CAMERAS

BACKGROUND OF THE INVENTION

The present invention relates to camera indicating devices, and more particularly to such indicating devices which indicate charge completion of a main capacitor of an electronic flash device for a camera provided with a focal plane shutter of which the leading and trailing shutter members travel successively in an assigned time interval.

In a focal plane shutter camera provided with an X flash synchronizing switch mechanism adapted to be closed only upon full opening of the shutter, i.e. full uncovering of the film plane (see for example U.S. Pat. No. 3,987,468), the X flash synchronizing switch is not closed for an exposure time shorter than the critical synchronizable shutter speed at which the film plane is fully uncovered in the minimum time period. Therefore, in that case, flash firing is not effected even if the flash charging has been completed. Thus, if an indication is made whenever the main capacitor is sufficiently charged, it may confuse the camera operator to believe that flash photography can be effective even in the case where flash firing is not effective because the exposure time is shorter than the critical synchronizable shutter speed.

SUMMARY OF THE INVENTION

An object of the present invention is to provide a camera indicating system that avoids the aforesaid confusion of the operator and indicates not only flash charge completion but the possibility of flash photography.

Another object of the present invention is to provide a flash charge completion indicating system for a camera which does not indicate charge completion of the main capacitor of an electronic flash device associated with the camera, when the exposure time is shorter than the critical synchronizable shutter speed.

According to the present invention, the indication of charge completion of the main capacitor is provided only when flash firing is prospectively effective even if charging of the electronic flash device has been completed. Accordingly, mis-information that flash photography would be effective with an exposure time that cannot effectuate flash firing is avoided. Thus, the indication of charge completion serves as an advance notice that flash photography can be effected.

DETAILED DESCRIPTION OF THE PREFERRED EMBODIMENT

Figure 1:
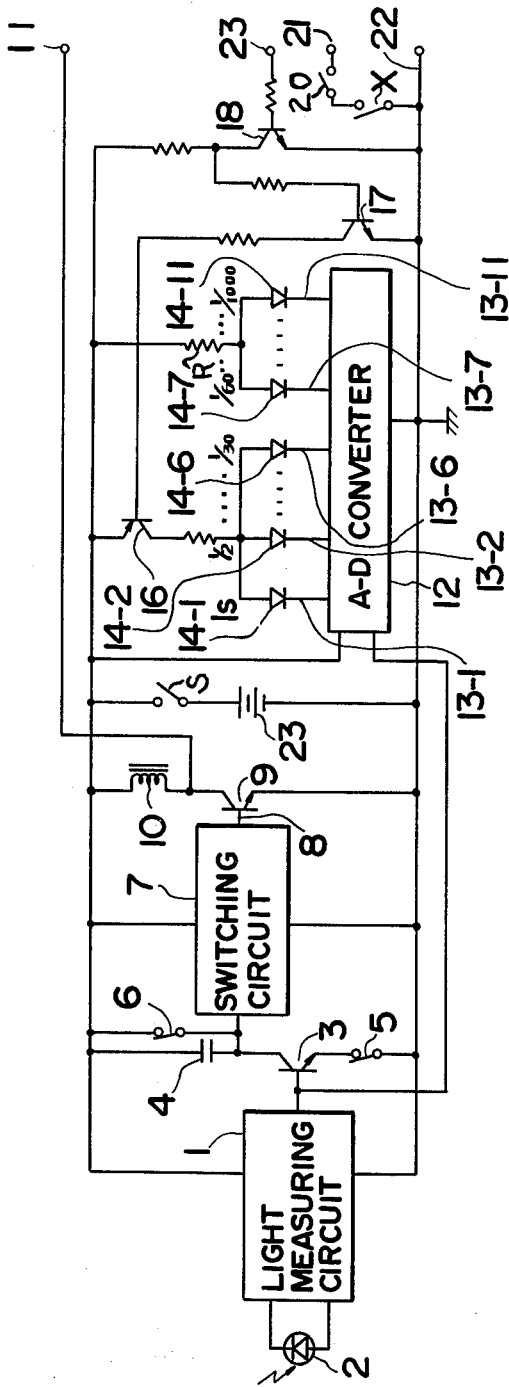
FIG. 1 is a circuit diagram of a preferred embodiment of the present invention.

Referring to FIG. 1, which shows a circuit embodiment intended to be disposed within a camera body, the circuit comprises a light measuring circuit, an exposure time control circuit and an exposure indicating circuit, the exposure indicating device also functioning as an indicator of charge completion for an electronic flash device.

Light measuring circuit 1 includes photoelectric element 2 receiving light from an object to be photographed and reflected from the film plane and/or the shutter curtain surface (for example, as shown in U.S. Pat. No. 3,687,026) to provide a light measurement output, and is summed together with a film sensitivity information signal and, in the case of diaphragm fully open light measurement, a signal representative of a preset diagram aperture value in a manner known to those skilled in the art. For example, the aforesaid signals, along with the signal representative of the object brightness, may be electronically processed in an operation corresponding to the exposure calculation in accordance with the APEX system, so that a voltage signal corresponding to an exposure time suitable for the given exposure parameters is obtained. Transistor 3 converts the exposure time control signal into a logarithmically expanded collector current signal which charges timing capacitor 4. When switch 5 is closed upon shutter opening, e.g., at the commencement of the first shutter curtain traveling, the charging of capacitor 4 is initiated. Short-circuit switch 6, connected in parallel with capacitor 4, is opened slightly before, or simultaneously with, the closing of switch 5. When the charge voltage of capacitor 4 reaches a given level, the output of switching circuit 7 is inverted to change the output at terminal 8 from a high to a low level. As a result, transistor 9, which has been conductive until then, is blocked to deenergize electromagnet 10 and release the restraint of the second shutter curtain thereby allowing the latter to start traveling. The output from light measuring circuit 1 is applied to A-D converter 12, which in turn discriminates the light measured output in accordance with the voltage level thereof and generates an output signal to any one of terminals 13-1 to 13-11 for energizing a corresponding one of light emitting diodes (LEDs) 14-1 to 14-11. It is noted that the potentials at terminals 13-1 to 13-11 may be normally high, but the potential at any one of them may be lowered when the output signal is applied.

Figure 2:
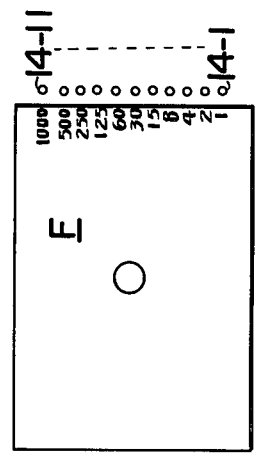
FIG. 2 is a plan view that schematically shows the arrangement of the shutter speed indicating device in a camera view finder.

As the output of light measuring circuit 1 presents exposure time information, all LEDs 14-1 to 14-11 are arranged in a line within the viewfinder for indicating the exposure time as shown in FIG. 2. LEDs 14-1 to 14-11 respectively indicate the respective shutter speed as marked in the Figure. LEDs 14-1 to 14-6, for indicating the shutter speed from 1 second to 1/30 second, are connected together at their anodes to the positive bus line from main power source 23 through the collector-emitter of transistor 16 with main power switch S closed. The remainder of LEDs 14-7 to 14-11, each corresponding to a respective shutter speed from 1/60 second to 1/1000 second, are connected at their anodes directly to the positive but line from power source 23 through resistor R and main power switch S. The purpose of dividing the LEDs into two groups is that only the group comprising the six LEDs 14-1 to 14-6 for indicating the lower shutter speeds can indicate the charge completion of the electronic flash device.

In this embodiment the boundary of the flash synchronizable shutter speed is between 1/60 and 1/30 second, and flash photography is effective for a shutter speed of 1/30 second or longer.

LEDs 14-1 to 14-6 for indicating a shutter speed 1/30 second or longer, are energized via transistor 16 as a group, and transistor 16 is controlled by transistor 18. The charge completion signal from the electroflash device (to be described hereinafter with respect to FIG. 3) is applied between terminal 23, connected to the base of transistor 18, and grounding terminal 22. The potential at terminal 23 is normally at a low level with transistor 18 being normally non-conductive, thereby transistors 16 and 17 are both conductive.

Thus, if the object has a brightness that requires 1/30 second of shutter speed, LED 14-6 is continuously energized to indicate that particular shutter speed. When charging of the main capacitor in the flash device (to be described with respect to FIG. 3) is completed, the rectangular voltage waveform as shown in FIG. 4 is applied between terminals 22 and 23, so that LED 14-6 is intermittently energized by the rectangular waveform signal because transistor 16 becomes alternately non-conductive and conductive with the base of transistor 18 alternately at a high and a low level. Thus, the fact that the object brightness requires a 1/30 second exposure can be indicated in the viewfinder, and that the charging of the electroflash device has been completed is also indicated.

When the object brightness has a value requiring a shutter speed longer than 1/30 second, LEDs 14-1, 14-2, etc., indicate both the shutter speed and the charge completion in the same manner as described above.

In the case where the object brightness has a value requiring a shutter speed shorter than 1/60 second, i.e., the speed at which flash firing is not achievable, one of LEDs 14-7 to 14-11, corresponding to shutter speeds not longer than 1/60 second, indicates only the shutter speed by emitting light continuously regardless of whether the electronic flash has been charged or not because LEDs 14-7 to 14-11 are not controlled by transistor 18.

Figure 3:
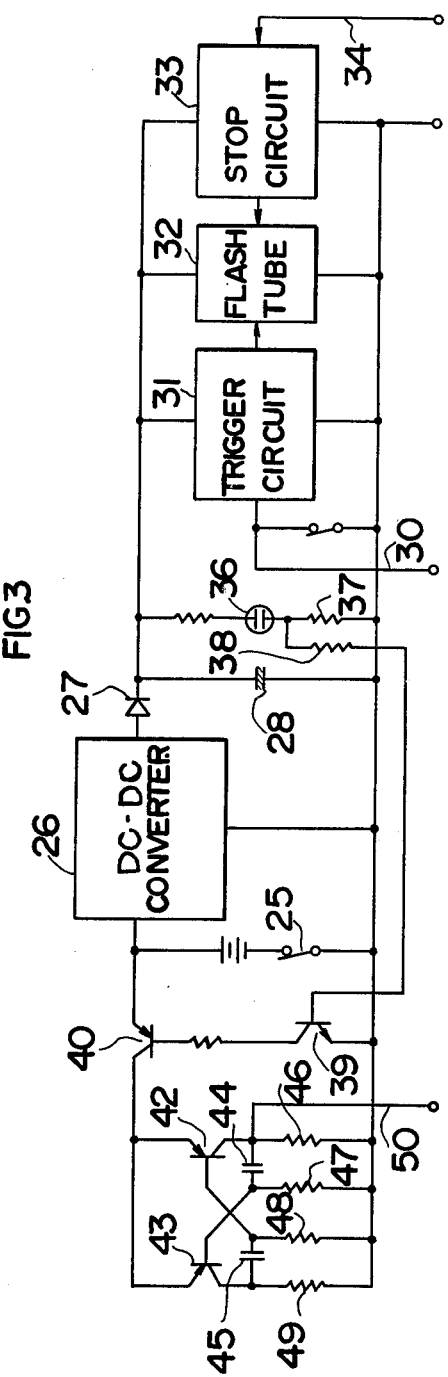
FIG. 3 is a circuit diagram of a preferred embodiment of the present invention within an electronic flash device.
Figure 4:
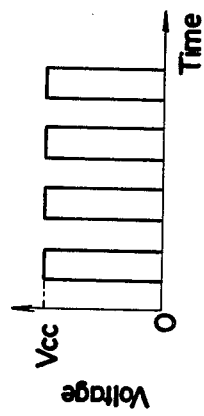
FIG. 4 shows a signal waveform to indicate flash charge completion in the preferred embodiment of the present invention.

Referring to FIG. 3, which shows a circuit diagram of an embodiment of the present invention provided within an electronic flash device, upon closure of power switch 25 main capacitor 28 for energizing flash tube 32 is charged via diode 27 by DC-DC converter 26, which converts a comparatively low input DC voltage into a high output DC voltage. The above mentioned term "charge completion" means the condition that capacitor 28 is charged above a given voltage level. Trigger circuit 31 is operated to trigger flash tube 32 when the potential at terminal 30 reaches ground level. Terminal 30 is connected to terminal 21 of the camera circuit shown in FIG. 1.

Synchronizing switch X in FIG. 1 is closed upon completion of the travel of the first curtain, and is connected in series with switch 20, which in turn is opened in response to the commencement of the travel of the second shutter curtain. Electronic flash tube 32 is fired when the first shutter curtain has completed its traveling before the second shutter curtain starts to travel i.e., when the shutter is fully opened. It is to be noted that the circuitry for firing the electronic flash with the shutter fully opened is not limited to that described above. When electronic flash tube 32 is fired, photocell 2 receives the light reflected by an object. Therefore, light measuring circuit 1 generates a photoelectric output commensurate with the sum of electronic flash light and ambient light. As the integration of the light measuring output reaches a given level corresponding to the amount of light for providing appropriate exposure, output terminal 8 is inverted to a high level, and the current for magnet 10 is cut off. As a result, the potential at terminal 11 becomes high. The high level at terminal 11, used as a flash firing stop signal, is applied to flash firing stopping circuit 33 via terminal 34 disposed within the electronic flash device and stops the firing of flash tube 32.

When main capacitor 28 is charged above the given level, indicating neon tube 36 is energized. The current flowing through neon tube 36 causes the potential at the upper end of resistor 37 to rise. This rising potential serves as a signal indicating flash charge completion and makes transistor 39 conductive to turn on transistor 40, so that the circuit at the left side of the transistor 40 is thereby energized. That circuit is an astable multivibrator comprising transistors 42 and 43, coupling capacitors 44 and 45, and resistors 46-49.

Resistors 46-49 serve to provide an appropriate time constant. Receiving electric power through transistor 40, the astable multivibrator circuit oscillates to generate an output at terminal 50 of rectangular waveform voltage signals as shown in FIG. 4, which serve as the charge completion signals and are then applied to the base of transistor 18 via terminal 23 (shown in FIG. 1) that is connected to terminal 50.

What is claimed is:

1. A photographic condition indicating system for a camera with an electronic flash device including an electronic flash tube, a main capacitor for energizing the flash tube and a circuit for charging the main capacitor at least to a given level, and which permits flash firing when the prospective effective exposure time is longer than a given value, said indicating system comprising:
    a light measuring circuit for generating an output signal as a function of the brightness of an object to be photographed;
    an indicating means;
    a first control circuit responsive to said output signal for controlling said indicating means to provide a first indication of an exposure time dependent on said output signal; and
    a second control circuit for controlling said indicating means to provide a second indication different than said first indication in response to said output signal when said main capacitor is charged to said given level and the prospective exposure time is longer than said given value.

2. The indication system according to claim 1 wherein said indicating means comprises a first set of indication elements for indication of exposure times longer than said given value, and a second set of indication elements for indication of exposure times equal to or shorter than said given value, and said second control circuit is connected with said first set of indication elements to provide said different indication.

3. The indication system according to claim 1 wherein said second control circuit includes an oscillation circuit disposed between said main capacitor and said indicating means to intermittently operate said indicating means with said main capacitor charged to said given level.

4. The indication system according to claim 1 further comprising an oscillation circuit connected with said main capacitor to be actuated upon the charging thereof to said given level, and wherein said indicating means comprises a plurality of light emitting elements selectively actuated for indication of the exposure time; and said second control circuit includes a transistor having the output thereof connected with some of said light emitting elements adapted for indication of exposure times longer than said given value, said transistor having a control electrode connected to the oscillation circuit to be intermittently conductive and nonconductive.

5. The indication system according to any one of claims 1 to 4 wherein the indication is made within a viewfinder field of the camera.

6. The indication system according to claim 1 further comprising an oscillation circuit connected with said main capacitor to be actuated upon the charging thereof to said given level, and wherein said indicating means comprises a first set of indication elements for indication of exposure times longer than said given value and a second set of indication elements for indication of exposure times equal to or shorter than said given level, both first and second sets of indication elements being connected with said first control circuit to be selectively energized depending on said output signal, said second control circuit includes a transistor having the output thereof connected commonly with said first set of indication elements, said transistor having a control electrode connected to the oscillation circuit to be intermittently conductive and non-conductive, thereby intermittently interrupting the energization of the indication element of said first set that is being energized by said first control circuit.

7. A photographic condition indicating system for a camera with an electronic flash device including an electronic flash tube, a main capacitor for energizing the flash tube and a circuit for charging the main capacitor at least to a given level, and which permits flash firing when the prospective exposure time is longer than a given value, said indicating system comprising:
   a light measuring circuit for generating an output signal as a function of the brightness of an object to be photographed;
   an indicating means;
   a first control circuit responsive to said output signal for controlling said indicating means to indicate an exposure time dependent on said output signal; and
   a second control circuit for controlling said indicating means to indicate that said main capacitor is charged to said given level, together with the indication of the exposure time by said first control circuit, when the prospective exposure time is longer than said given value, said indicating means being coupled with said second circuit to indicate only the exposure time dependent on said output signal when the prospective exposure time is equal to or shorter than said given value, even when the main capacitor is charged to said given level.

8. The indication system according claim 7 wherein said second control circuit includes an oscillation circuit for intermittently energizing said indication means, which is indicating the exposure time, to indicate the charging of said main capacitor.

9. A photographic condition indicating system for a camera with an electronic flash device including an electronic flash tube, a main capacitor for energizing the flash tube and a circuit for charging the main capacitor at least to a given level, and which permits flash firing when the prospective effective exposure time is longer than a given value, said indicating system comprising:
   a light measuring circuit for generating an output signal as a function of the brightness of an object to be photographed;
   an indicating means;
   a first control circuit responsive to said output signal for controlling said indicating means to indicate an exposure time dependent on said output signal; and
   a second control circuit for controlling said indicating means to indicate the charging condition of said main capacitor, said second control circuit being coupled with said indicating means to be inoperative when the prospective exposure time is equal to or shorter than said given value.

* * * * *